United States Patent [19]
Chaudhry

[11] Patent Number: 5,832,485
[45] Date of Patent: Nov. 3, 1998

[54] METHOD FOR EDITING VIEWS CREATED BY JOINS

[75] Inventor: Atif Chaudhry, Newark, Calif.

[73] Assignee: Oracle Corporation, Redwood Shores, Calif.

[21] Appl. No.: 601,127

[22] Filed: Feb. 14, 1996

[51] Int. Cl.$^6$ .................................................. G06F 17/30
[52] U.S. Cl. .................... 707/9; 707/1; 707/200; 707/201; 707/100
[58] Field of Search ..................... 395/611, 613, 395/616, 617; 707/1, 9, 200, 201, 100, 102

[56] References Cited

U.S. PATENT DOCUMENTS 5,276,870   1/1994   Shan et al. ............................... 395/600

OTHER PUBLICATIONS

Segev et al., "Currency–Based Updates to Distributed Materialized Views", IEEE, pp. 512–520, Dec. 1990.

*Primary Examiner*—Thomas G. Black
*Assistant Examiner*—Donald Min
*Attorney, Agent, or Firm*—McDermott, Will & Emery

[57] ABSTRACT

A method and apparatus for selectively allowing data presented in a join view to be modified is disclosed. Data presented in a join view is allowed to be modified if provided to the join view by a key-preserved table. A table is a key-preserved table with respect to a join view if each of the keys of the table is a key of the join view. Key-preserved tables may be identified by inspecting the definition of a join view to identify the base tables of the join view and to generate a graph. In the graph, each node corresponds to one of the base tables. Directed edges between nodes of the graph correspond to relationships, specified in the definition of the join view, between the base tables. The graph is reduced to strong components, each of which corresponds to a set of the base tables in which each base table in the set is routed to each other base table in the set by one or more directed edges. If a strong component in the resulting graph constitutes a unique source vertex, then each of the tables corresponding to the unique source vertex are key-preserved tables.

33 Claims, 9 Drawing Sheets

Fig. 2A

Table Employee

| EmployeeNo | Name | Salary | DeptNo |
|---|---|---|---|
| 1 | Joe | 25k | 10 |
| 2 | Bob | 40k | 20 |
| 3 | Jan | 80k | 10 |
| 4 | Tom | 40k | 20 |
| 5 | Ann | 50k | 50 |
| 6 | Pat | 18k | 30 |

Fig. 2B

Employee Table Definition

Create Table Employee
        EmployeeNo   Key
        Name
        Salary
        DeptNo

Fig. 3A

Table Department

| DeptNo | DeptName | Location |
|--------|----------|----------|
| 10 | Accounting | NY |
| 20 | R&D | SF |
| 30 | Production | L A |
| 40 | Sales | L A |

Fig. 3B

Department Table Definition

Create Table Department
        DeptNo    Key
        DeptName
        Location

Fig. 4A

Join View EmpView

| EmployeeNo | Name | Salary | DeptNo | Location | DeptName |
|---|---|---|---|---|---|
| 1 | Joe | 25k | 10 | NY | Accounting |
| 2 | Bob | 40k | 20 | SF | R&D |
| 3 | Jan | 80k | 10 | NY | Accounting |
| 4 | Tom | 40k | 20 | SF | R&D |

Fig. 4B

Join View EmpView Definition

Create View EmpView
    Select        EmployeeNo, Name, Salary, Employee.DeptNo, Location, DeptName From        Department, Employee Where       Salary > 20k and
                   DeptNo < 40 and
                 Employee.DeptNo = Department.DeptNo

Figure 5A

Join View HiddenKey

| Name | Salary | DeptNo | Location | DeptName |
|------|--------|--------|----------|----------|
| Joe  | 25k    | 10     | NY       | Accounting |
| Bob  | 40k    | 20     | SF       | R&D      |
| Jan  | 80k    | 10     | NY       | Accounting |
| Tom  | 40k    | 20     | SF       | R&D      |

Fig. 5B

Join View HiddenKey Definition

Create View HiddenKey
    Select      Name, Salary, Employee.DeptNo, Location, DeptName
    From       Department, Employee
    Where     Salary > 20k and
                  Dept. No < 40 and
                  Employee.DeptNo = Department.DeptNo

Fig. 6A

Join View LostKey

| EmployeeNo | Name | Salary | DeptNo. | Location | DeptName |
|---|---|---|---|---|---|
| 1 | Joe | 25k | 10 | Accounting | NY |
| 1 | Joe | 25k | 10 | R&D | SF |
| 1 | Joe | 25k | 10 | Production | LA |
| 1 | Joe | 25k | 10 | Sales | LA |
| 2 | Bob | 40k | 20 | Accounting | NY |
| 2 | Bob | 40k | 20 | R&D | SF |
| 2 | Bob | 40k | 20 | Production | LA |
| 2 | Bob | 40k | 20 | Sales | LA |
| 3 | Jan | 80k | 10 | Accounting | NY |
| 3 | Jan | 80k | 10 | R&D | SF |
| 3 | Jan | 80k | 10 | Production | LA |
| 3 | Jan | 80k | 10 | Sales | LA |
| 4 | Tom | 40k | 20 | Accounting | NY |
| 4 | Tom | 40k | 20 | R&D | SF |
| 4 | Tom | 40k | 20 | Production | LA |
| 4 | Tom | 40k | 20 | Sales | LA |
| 5 | Ann | 50k | 50 | Accounting | NY |
| 5 | Ann | 50k | 50 | R&D | SF |
| 5 | Ann | 50k | 50 | Production | LA |
| 5 | Ann | 50k | 50 | Sales | LA |
| 6 | Pat | 18k | 30 | Accounting | NY |
| 6 | Pat | 18k | 30 | R&D | SF |
| 6 | Pat | 18k | 30 | Production | LA |
| 6 | Pat | 18k | 30 | Sales | LA |

Fig. 6B

Join View LostKey Definition

Create View LostKey

Select        EmployeeNo, Name, Salary, Employee.DeptNo,

Location, DeptName

From         Department, Employee

SCE → SCD

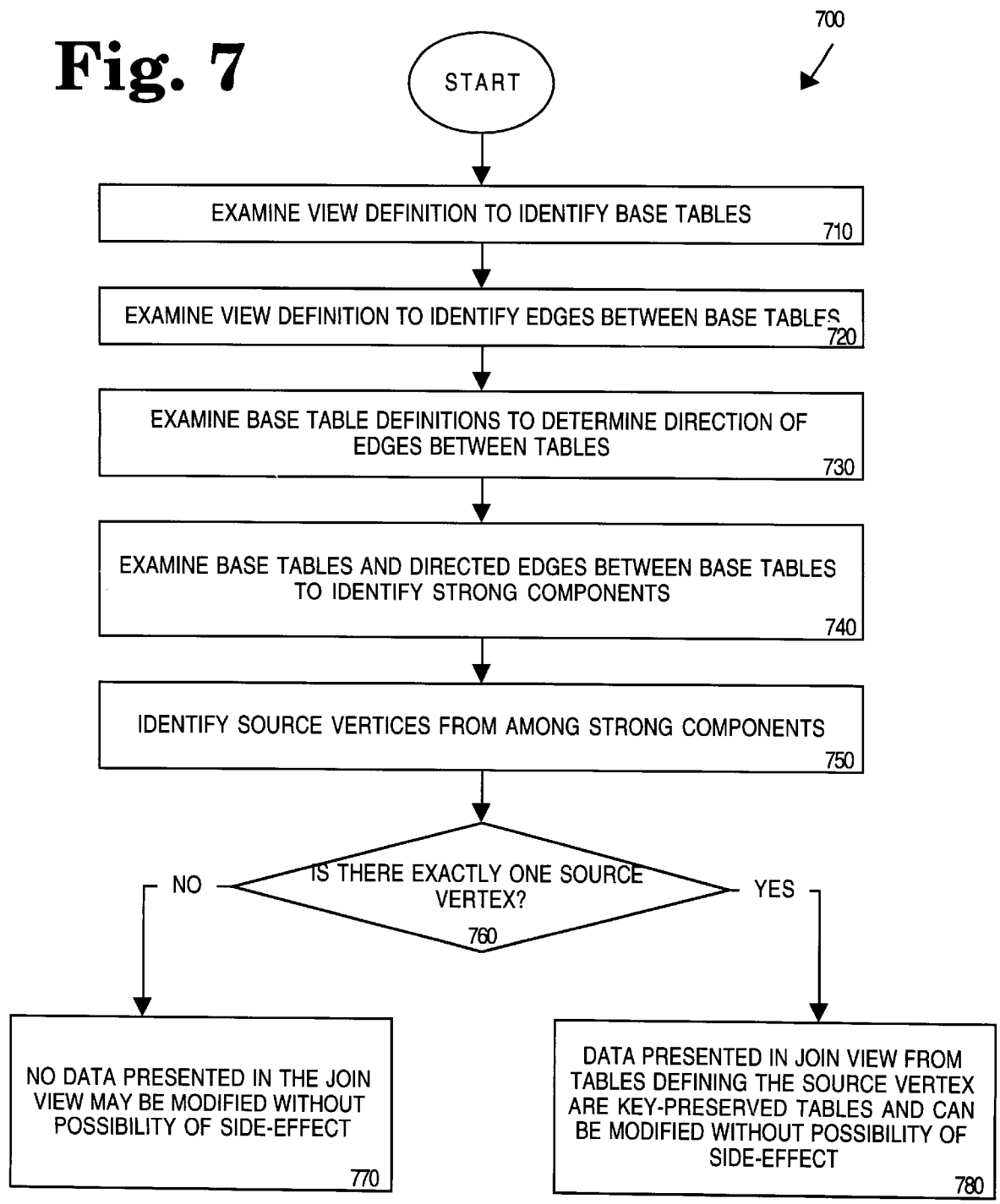

METHOD FOR EDITING VIEWS CREATED BY JOINS

BACKGROUND OF THE INVENTION

(1) Field of the Invention

The present invention relates to the field of data base management. More specifically, the present invention relates to a method and apparatus for selectively allowing data presented in a join view to be modified.

(2) Prior Art

In a data base management system (DBMS), data is stored in one or more data structures referred to herein as tables, with each table comprising one or more categories of information. In order to view data held in the tables, a DBMS user issues a command to present data in accord with a view definition. In the view definition the DBMS user specifies the tables from which data is to be drawn, the data categories of interest and logical relations constraining the data to be presented in the view.

FIG. 2A illustrates a data table named Employee which contains four categories of employee data: employee number, name, salary and department number. FIG. 3A illustrates a second data table named Department which contains three categories of department data: department number, department name and department location. FIG. 4A illustrates a view named EmpView which presents data drawn from tables Employee and Department. View EmpView belongs to a class of views known as "join views" because each data record presented in the view results from a reference to more than one table, viz., tables Employee and Department.

Suppose a DBMS user viewing EmpView wishes to increase Joe's salary from 25k to 40k. Ideally, the DBMS user would like to perform the modification directly to the join view, without having to explicitly modify the underlying base table, Employee. Of course, since EmpView is merely a presentation of data from multiple tables and is not an actual table itself, any meaningful change requires that the underlying base table, Employee, be modified. One way in which the DBMS could respond to a request to modify Joe's salary as presented in view EmpView would be to inspect the view definition statement shown in FIG. 4B to determine which table supplied the data to be modified. Upon learning that the data of interest was drawn from table Employee, the DBMS could simply change Joe's salary in table Employee. In this way, modification of data presented in a join view is automatically translated into a modification of the underlying base table containing the data.

Suppose now, however, that Joe has moved from New York to San Francisco and the DBMS user wishes to update his location using view EmpView. Following the steps described above, inspection of the view definition statement of FIG. 4B reveals that the Location data presented in EmpView is provided by the Location category of table Department. Notice what happens, however, if a change in Joe's location in EmpView is translated into a change in the Location category of table Department. The location of Department number 10 and everyone one in it will be changed to SF. By using the method described above to modify view EmpView, the act of changing Joe's location to SF would have the undesirable side-effect of changing Jan's location to SF as well. Both changes would propagate to the join view EmpView.

As the foregoing example makes clear, not all data in a join view may be modified without side-effects. Consequently, prior art implementations have either disallowed modification of data presented in a join view to prevent possible side-effects, or they have allowed modification of data presented in a join view despite possible side-effects. Prior art implementations allowing join view data to be modified despite possible side-effects have generally required that the DBMS user explicitly state the semantics by which view modifications are translated to modification of the underlying base tables. Since software applications often employ join views, the DBMS user specifying a join view is often an application developer who must embed translation semantics in the application attempting to edit the join view.

What is needed therefore, is a method for determining whether side-effects could possibly result from modification of data presented in a join view. Data modification to data presented in a join view could then be selectively allowed based on whether side-effects could possibly result. Consequently, the need for DBMS users to explicitly specify the semantics by which modification of view data is translated to modification of underlying base tables could be avoided.

SUMMARY OF THE INVENTION

A method and apparatus for determining whether data presented in a join view can be modified without possibility of side-effects is disclosed. Data presented in a join-view is obtained by reference to two or more tables. In some cases attempts to modify the data, as it appears in the view, results in side-effects. Through a method comprising the steps of identifying the table containing the data sought to be modified in the view and determining whether the table is a key-preserved table with respect to the view, it can be determined whether modification of the data may possibly result in side effects. If the table providing a particular set of data to the view is a key-preserved table, then no side-effects may possibly result from modification of data from the particular set of data in the view.

BRIEF DESCRIPTION OF THE DRAWINGS

FIG. 2A illustrates table Employee.

FIG. 2B illustrates a table definition defining table Employee.

FIG. 3A illustrates table Department.

FIG. 3B illustrates a table definition defining table Department.

FIG. 4A illustrates join view EmpView.

FIG. 4B illustrates a view definition defining join view EmpView.

FIG. 5A illustrates join view HiddenKey.

FIG. 5B illustrates a view definition defining join view HiddenKey.

FIG. 6A illustrates join view LostKey.

FIG. 6B illustrates a view definition defining join view LostKey.

FIG. 7 illustrates a method for practicing the present invention.

FIGS. 8A, 8B and 8C illustrate directed graphs corresponding to join view EmpView.

DETAILED DESCRIPTION OF THE INVENTION

In the following detailed description of the present invention, numerous specific details are set forth in order to provide a thorough understanding of the present invention. However, it will be obvious to one skilled in the art that the present invention may be practiced without these specific details. In other instances well known methods, procedures, components, and circuits have not been described so as not to unnecessarily obscure aspects of the present invention.

Hardware Overview

Figure 1:
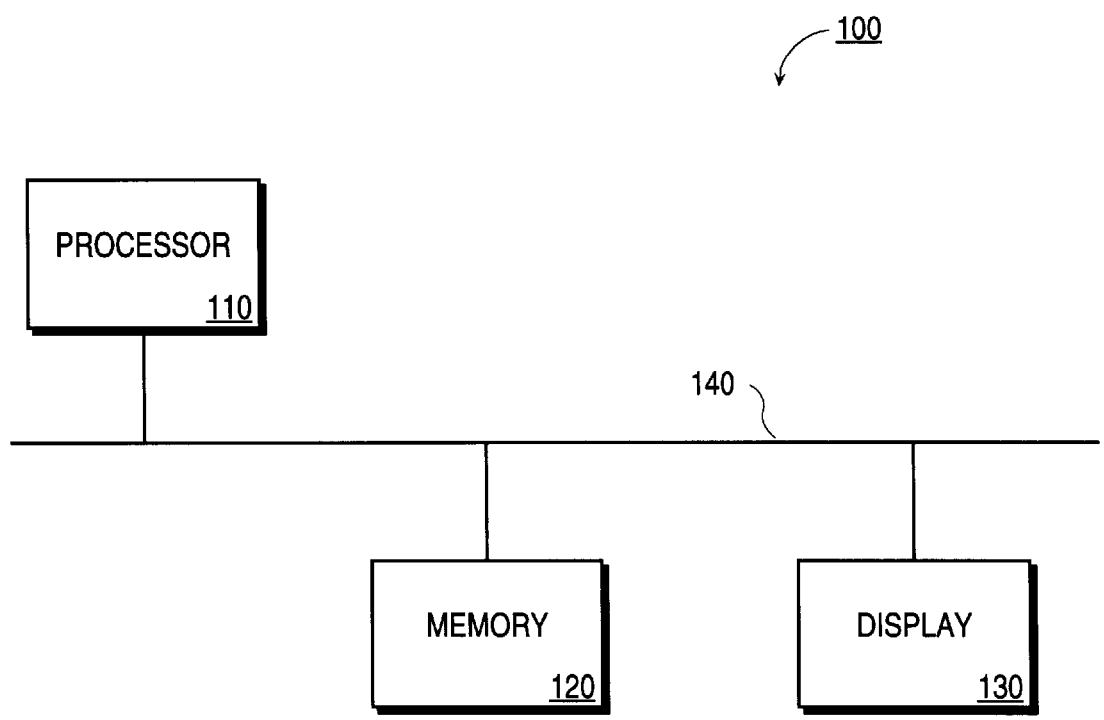
FIG. 1 illustrates a general purpose computer system.

FIG. 1 illustrates a general purpose computer system 100 having a processor 110, memory 120, and a display 130, each coupled to bus 140. Processor 110 fetches instructions stored in memory 120 and executes the instructions to perform operations on data, which is also stored in memory 120. Execution of certain sequences of instructions by processor 110 results in processor 110 writing data to display 130 to present an image thereon.

Computer programs, such as operating systems (OS) and database management systems (DBMS) comprise sequences of instructions that may be stored in memory 120. Memory 120 includes both operating memory and non-volatile storage such as a read-only-memory, a hard disk-drive, a floppy disk-drive or some other computer-readable medium. When power is applied to the computer system 100, an OS is loaded from non-volatile storage into operating memory by processor 110 or another device, such as a direct memory access controller (not shown), having access to memory 120. Sequences of instructions comprised by the OS are then executed by processor 110 to load other computer programs and portions of computer programs into operating memory from nonvolatile storage. The present invention may be embodied in a sequence of instructions which can be stored in a computer-readable medium and executed by processor 110.

Database Management System (DBMS)

A DBMS is a computer program or group of computer programs used to manage data in a database for the benefit of one or more DBMS users. A DBMS user may be an individual or a computer system, including the computer system executing the DBMS. In the computer system 100 of FIG. 1, sequences of instructions comprised by the DBMS are executed by the processor 110 to carry out requests of the DBMS user. These include requests to create storage organizations in memory 120, requests to store data in storage organizations previously created, requests to present views of data held in storage organizations, and requests to operate on data held in storage organizations either directly or through a view.

Tables, Records and Keys

Tables are storage organizations used to hold data in a database. Herein, the term table is broadly defined to be a data structure containing one or more categories of data and includes, but is not limited to, tables in a relational or hierarchical data base, objects comprising data and associated operations, and frameworks of objects. Data contained in a table is organized in one or more records.

A record is a uniquely identified grouping of table data consisting of data values from different categories of the table. A record is uniquely identified by data values in one or more table categories referred to as keys.

A key is one or more categories of table data from which the data values (referred to herein as key values) comprised by any one record are required to be unique from that of any other record. Examples of data categories which could constitute a key of a table include social security numbers; pointers, each of which points to a next record in the table; and a simple enumeration of values. In each case a single key value uniquely identifies the record of which it is a constituent. In another example, a table containing records of geosynchronous satellites might be keyed by a combination of two categories of data: one category containing the latitude and the other the longitude of each satellite in the table. Two satellites might share the same latitude or the same longitude, but not both. Accordingly, only in combination do the latitude and longitude data categories define a key of the table, a longitude and latitude value together being referred to as a key value uniquely identifying a particular satellite record.

Exemplary Tables and Table Definitions

FIG. 2A illustrates table Employee which comprises four categories for storing data: EmployeeNo, Name, Salary and DeptNo. Six records of data, each containing a value in each of the four categories, have been entered into the table. The categories correspond to the columns of the table and the records correspond to the rows of the table. This is for convenience only and should not be construed as limiting the definition of the term table given above. Each data member of category EmployeeNo is required to be unique. Category EmployeeNo is, therefore, a key of the table. Each value of category EmployeeNo identifies a single, unique record of the table. Notice that the data values in categories Name and Salary are also unique. Unlike category EmployeeNo, however, there is no logical requirement that values held in categories Name and Salary be unique and categories Name and Salary are, therefore, not keys of the table.

To create a table, a DBMS user specifies a table definition designating an identifier or name for the table and the categories in which table data is organized. A table definition may also specify that one or more categories of data represent a key of the table.

FIG. 2B depicts the table definition used to create the Employee table of FIG. 2A. The table definition specifies table identifier "Employee", and specifies the four categories for storing data. Furthermore, category EmployeeNo is designated as a key of the table. Note that the table definition specifies the categories of information to be contained in the table, but does not specify the data values themselves. The DBMS user does that by inserting, deleting or modifying table records.

FIG. 3A illustrates table Department which comprises three categories for storing data: DeptNo, DeptName and Location. Four records of data have been entered into the table, each being keyed by a value from category DeptNo. FIG. 3B depicts the table definition used to create the Department table of FIG. 3A.

Exemplary View

FIG. 4A illustrates a view of data held in tables Employee and Department shown in FIGS. 2A and 3A, respectively. A view is a presentation of data to the DBMS user. A view typically does not contain the data presented, but rather contains references to the one or more tables containing the data. In generating the view, the DBMS translates the reference of a datum to be presented into an address of a data value held in or pointed to by a table. For convenience, the data presented in a view is occasionally referred to herein as "view data", but is typically not stored in the view. Furthermore, the tables referenced to present data in the view are referred to herein as base tables or tables underlying the view. Base tables are occasionally described herein as "providing data" to the view, but this is merely a convenient expression to denote the act of translating a datum referenced in the view into a memory location in or pointed to by the base table and accessing the contents therein. Any number of well known techniques may be employed to translate references in the view to table data and such techniques will not be described in detail herein. Also, it will be appreciated that presentation of data in a view may or may not require the view to be displayed on a computer system display, depending on the needs of the DBMS user.

Preserved Keys

Note that the data presented in the view of FIG. 4A is organized in categories and records just like a table. Ideally, edit operations that apply to tables should apply equally to a view. This is not always the case, however, and the determination of whether an edit operation can be performed on a particular class of views, known as join views, depends upon whether the keys of an underlying base table are also keys of the view. A key of a base table is said to be a key of a view if the uniqueness constraint imposed on the table key is maintained in the view. If, under the logical constraints defining the view, a key of the table must be unique in the view, the key of the table is a key of the view and the key of the table is preserved in the view. If each of the keys of a table is preserved in a view, the table is said to be a key-preserved table with respect to the view.

It is important to note that a key of a table need not be presented in a view to be a key of the view. A table key is considered to be a key of the view, and therefore preserved by the view, if the key category could have been presented in the view without violating the uniqueness constraint. FIG. 5A, for example, illustrates a view designated "HiddenKey" which is identical to the view of FIG. 4A, except that the key category, EmployeeNo, is not presented. An inspection of the view definition of HiddenKey, shown in FIG. 5B, reveals that the EmployeeNo category has been removed from the "select" clause. In every other respect, the view definition of HiddenKey is the same as that of EmpView. Despite the fact that the key, EmployeeNo, does not appear in view HiddenKey, EmployeeNo is a key of view HiddenKey because EmployeeNo could have been presented in HiddenKey without violating the uniqueness constraint by simply adding it to the "select" clause.

The present invention pertains to edit operations performed on the class of views known as join views. A join view is a view in which data presented in each record of the view is obtained by reference to two or more tables. Note carefully that, under this definition, the join view class includes a view in which the data actually presented is obtained entirely from one table, but in which a second table is used to logically constrain the data in a given record.

View Definition

Like tables, views are created by definitions, referred to herein as view definitions. View definitions are specified by a DBMS user. FIG. 4B depicts the view definition used to present view EmpView of FIG. 4A. EmpView is a join view because more than one table is referenced to present each record in the view. The view definition specifies the base tables, Employee and Department, from which data presented in EmpView is drawn; the categories of data presented in EmpView; and several logical relations constraining the data presented. It is convenient to refer to the view definition in terms of clauses and predicates. For example, the clause "From Department, Employee" is referred to as a "from" clause and specifies the base tables from which data presented in EmpView is drawn. The clause "Select EmployeeNo, . . . , DeptName" is referred to as a "select" clause and specifies the categories of data presented in EmpView. The clause "Where Salary>20k, DeptNo<50, Employee.DeptNo=Department.DeptNo" is referred to as a "where" clause and specifies logical relations constraining the data presented in the view. The individual logical relations in the "where" clause are referred to as predicates. For example, the logical relation "Salary>20k" is a predicate imposing a constraint which prevents data corresponding to employee Pat from appearing in the view because Pat's salary is less than 20k. Similarly, the logical relation "Department No<40" is a predicate preventing data corresponding to employee Alice from being presented in the view, since Alice belongs to department number 50. The logical relation "Employee.DeptNo=Department.DeptNo" is a special type of predicate referred to herein as a join predicate. A join predicate is an equality expression in which two or more tables appear as operands. A join predicate is said to "equi-join" the referenced tables. Here, the join predicate joins the Department and Employee tables by equating the DeptNo categories of each. "Employee.DeptNo" and "Department.DeptNo" are operands in the join predicate and the equality operator defines the manner in which data entries from the two tables are presented together in the join view.

Join View Presentation

To present a join view of two base tables, data in each record of one table is compared against data in each record of the other table to determine whether logical requirements set forth in the view definition are satisfied. This technique is, of course, extensible to join views having more than two base tables. In a join of a table having five records (five key values) and a table having four records, up to 5×4=20 records are compared against one another. To present the join view of FIG. 4A based on the view definition of FIG. 4B, for example, the first record of the table of FIG. 2A is first compared against the first record of the table of FIG. 3A. If each of the logical constraints set forth in the view definition is satisfied, data from each of the categories of data specified in the view definition are presented in the first record of the view. In the join view of FIG. 4A, for example, employee number, name, salary and department number are drawn from the first record of table Employee, while department name and location are drawn from the first record of table Department. Note that the view definition shown in FIG. 4B resolves the conflict as to which of the base tables provides DeptNo data to the view by explicitly identifying category Employee.DeptNo to be presented in the view.

The first record of table Employee is now compared against the second record of table Department. Since the DeptNo values do not match, no data is presented in the view from the combination of the first record of Employee and the second record of Department. The first record of Employee is likewise compared with the remaining records of Department without presenting combinations of data thereof in the view. Now, the second record of Employee is compared against each of the records of Department in succession. The second record of Employee is combined only with the second record of Department to present data in the view, since no other record of Department contains department number 20.

The third record of Employee is successively compared with each of the records of Department, presenting data to the view only in combination with the first record of Department. Similarly the fourth, fifth and sixth records of Employee are each compared against the four records of Department to determine whether the join criteria is satisfied.

It will be appreciated that while the first record of Employee was compared against each of the records of Department before proceeding to successive records of Employee, there is no reason that the view could not be developed by comparing each of the records of Employee against the first record of Department before proceeding to successive records of Department. Furthermore, one skilled in the art will appreciate that the total number of comparisons may be reduced by logical reduction. For example, there is no need to compare the fifth record of Employee against any records of Department since department number 50 fails the DeptNo<50 requirement of the view definition.

FIG. 6A illustrates join view LostKey defined by the view definition of FIG. 6B. Notice that the view definition shown in FIG. 6B is identical to that shown in FIG. 4B except that the "where" clause is missing. As a result, each comparison of record data in Employee (FIG. 2A) with record data in Department (FIG. 3A) satisfies the view definition and results in data presented to view LostKey. Consequently, 24 rows of data are presented in view LostKey (6 records from Employee×4 records from Department).

Editing Join Views

To change the data presented in a join view it is necessary to translate the requested modification into a modification of the underlying base table which actually contains the data of interest. However, translation of some view modification requests into base table modifications results in undesired changes in other view data, known as side-effects. As discussed above in reference to the join view of FIG. 4A, for example, an attempt to change Joe's location from NY to SF results in the undesirable side-effect of causing Jan's location also to be changed from NY to SF. The present invention solves this problem by automatically determining whether join view data may be changed without possibility of side-effects and allowing modification only to join view data resulting in no possibility of side-effects.

Recall that a table having its keys preserved through a join with one or more other tables is a key-preserved table. Due to the fact that the uniqueness constraint imposed on the keys of a key-preserved table is preserved in a join view, data provided to a join view from a key-preserved table may be modified without side-effect. Modification of data provided to a join view from a table other than a key-preserved table may not be performed without possible side-effects. Note that a table may have its keys preserved in one join (view), but not another. Therefore, a determination of whether a table is a key-preserved table must be made with respect to a particular join (view).

Identifying Key-Preserved Tables

FIG. 7 illustrates a method 700 comprising computer-implementable steps for determining which tables providing data to a join view are key-preserved tables. By application of the method 700, data presented in a join view may be selectively modified in the view depending upon whether the data sought to be modified is provided to the view by a key-preserved table.

The first step 710 in determining whether data presented in a join view can be modified is to identify each of the tables providing data to the join view. This is accomplished by examining the view definition used to create the view and identifying the base tables listed in the "from" clause therein. To identify the base tables of join view EmpView of FIG. 4A, for example, the "from" clause of the view definition shown in FIG. 4B is examined, revealing that two base tables, Employee and Department, are referenced to present view EmpView.

Identifying Directed Edges

Once each of the base tables of the view have been identified, the next step 720 is to identify edges between the base tables. This is done by further examining the view definition statement to identify edges between base tables. An edge is said to exist between two base tables when the tables appear as operands in a join predicate. Referring to the view definition of FIG. 4B, the statement "Employee.DeptNo=Department.DeptNo" is a join predicate defining an edge between base tables Employee and Department. Each of the tables appears as an operand of an equality expression (the syntax Employee.DeptNo simply qualifies the reference to category DeptNo as a category belonging to table Employee).

It is helpful at this point to describe the application of the method 700 of FIG. 7 to the join view of FIG. 4A in terms of directed graphs and directed acyclic graphs. Directed graphs and directed acyclic graphs are known to those skilled in the computer science arts and will not be discussed herein beyond the extent necessary to disclose the present invention. In FIG. 8A, base tables Employee and Department are shown as nodes of a directed graph. Node E represents base table Employee and node D represents base table Department. The edge between tables Employee and Department, identified in step 720, is depicted as a line between nodes E and D.

Returning to the method 700 of FIG. 7, at step 730, the direction of each edge identified in step 720 is determined by examining the definition of the base tables having edges between them. An edge is directed toward a first of the tables, and therefore a directed edge, if a key of the first table is an operand of the join predicate defining the edge. Referring to join view EmpView of FIG. 4A, for example, to determine the direction of the edge between base tables Employee and Department, if any, it must be determined whether DeptNo is a key of table Employee and whether DeptNo is a key of table Department. This determination is made by examining the base table definitions shown in FIGS. 2B and 3B. Examination of the table definition in FIG. 2B reveals that DeptNo is not a key of table Employee. Examination of the table definition in FIG. 3B, however, reveals that DeptNo is a key of table Department. Consequently, the edge between tables Employee and Department is a directed edge, directed toward table Department. This consequence is graphically illustrated in FIG. 8B by placing an arrow at the end of the edge to direct the edge toward node D.

Identifying Strong Components

Proceeding now to step 740 of FIG. 7, the base tables and directed edges between base tables are examined to identify strong components. A strong component is a maximal set of one or more base tables in which each base table of the set is routed to every other base table in the set by one or more directed edges. Each base table must appear in one and only one strong component. A first base table is considered to be routed to a second base table if one or more directed edges provide a path directed from the first base table to the second base table. FIGS. 9A–9D and 10A–10D are provided to illustrate the concept of identifying strong components. FIGS. 9A–9D illustrate directed graphs obtained by performing steps 710 through 730 of method 700 on four hypothetical join views and their respective base tables (the hypothetical join views and base tables are not shown). FIGS. 10A–10D depict graphs of the strong components identified by applying step 740 of method 700 to the directed graphs of FIGS. 9A–9D, respectively. The graphs of FIGS. 10A–10D are known as directed acyclic graphs (DAGs).

Figure 9A:
FIGS. 9A, 9B, 9C and 9D illustrate directed graphs corresponding to hypothetical join views.
Figure 10A:
FIGS. 10A, 10B, 10C and 10D illustrate directed acyclic graphs of strong components identified in the directed graphs of FIGS. 9A, 9B, 9C and 9D.

In FIG. 10A, two strong components are shown: SC1, comprising node A of FIG. 9A, and SC2, comprising node B of FIG. 9A. Node A of FIG. 9A constitutes a strong component because it represents the only table of a set of tables which are each routed to the other. Note that each table of a strong component is considered inherently routed to itself and that, therefore, a single table may constitute a strong component. The set of nodes {A, B} of FIG. 9A does not define a strong component. Node A is routed to node B, but node B is not routed to node A. Consequently, each node of the graph in FIG. 9A defines a separate strong component in the DAG of FIG. 10A. The base tables represented by nodes A and B are said to define strong components SC1 and SC2, respectively. SC1 and SC2 are nodes of the DAG of FIG. 10A. Herein, nodes of DAGs are referred to as vertices to avoid confusing them with nodes of directed graphs. The directed edge between nodes A and B in FIG. 9A occurs between two strong components and therefore is carried forward to the DAG of FIG. 10A. The directed edge is directed from SC1 to SC2, thereby maintaining the directionality of the edge between nodes A and B.

Figure 9B:
Figure 10B:
Figure 9C:
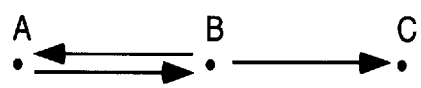
Figure 10C:
Figure 9D:
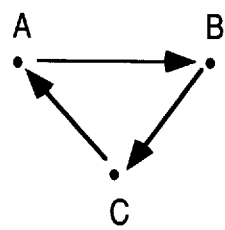
Figure 10D:

In FIG. 9B, nodes A and B are presented with an additional directed edge routing node B to node A. FIG. 10B, therefore, depicts a DAG having a single strong component SC1. SC1 is defined by the tables represented by nodes A and B of FIG. 9B. In FIG. 9C, nodes A, B and C are present indicating a join view having three base tables. The set of nodes {A, B} of FIG. 9C constitute a strong component because each node of the set is routed to each other node of the set. There is no path routing node C to another node, however, so node C alone constitutes a second strong component. Consequently, the DAG illustrated in FIG. 10C contains two strong components, SC1 and SC2 with the directed edge between nodes B and C of FIG. 9C carried forward to the DAG. In FIG. 9D, nodes A, B and C are presented again. Here, a single strong component comprises each of the three nodes because directed edges provide paths from node A to nodes B and C, from node B to nodes C and A, and from node C to nodes A and B. For instance, the directed edge between nodes A and B together with the directed edge between nodes B and C provides a path routing node A to node C. FIG. 10D illustrates a DAG containing the single strong component, SC1, defined by nodes A, B and C of FIG. 9D.

Returning to the join view of FIG. 4A, it has been determined by application of steps 710 through 730 of method 700 that the join view references base tables Employee and Department and that a directed edge extends from table Employee toward table Department. The directed graph of FIG. 8b illustrates this situation. Now applying step 740 of method 700, two strong components are identified: a first strong component defined by table Employee and a second strong component defined by table Department. The two tables do not combine to define a strong component because there is no directed edge routing table Department to table Employee. FIG. 8C illustrates the DAG of strong components defined by the join view of FIG. 4A. Vertices $SC_E$ and $SC_D$ represent the strong components defined by the join view's base tables Employee and Department, respectively. The directed edge between tables Employee and Department, not being part of a strong component, is carried forward to the DAG of FIG. 8C.

Identifying Source Vertices

Proceeding now to step 750 of FIG. 7, the strong components and directed edges between strong components identified in steps 710–740 are examined to identify strong components constituting source vertices. A source vertex is a strong component having no incoming directed edges. A strong component has an incoming directed edge if there is a directed edge routed from a table outside the strong component to a table within the strong component. FIGS. 10A–10D illustrate the concept of a source vertex. Vertex SC1 of FIG. 10A, for example, is a source vertex because it has no incoming directed edge. Vertex SC2 is not a source vertex because of the directed edge extending from SC1 toward SC2. In the DAG of FIG. 10B, SC1 is a source vertex by definition; there can be no incoming paths since there are no other vertices. The DAGs of FIGS. 10C and 10D are identical to the DAGs of FIGS. 10A and 10B, respectively. For the same respective reasons, therefore, SC1 of FIG. 10C and SC1 of FIG. 10D constitute source vertices.

Applying step 750 of method 700 to the strong components $SC_E$ and $SC_D$ of the DAG of FIG. 8C, it is evident that $SC_E$ has no incoming edge and is, therefore, a source vertex. $SC_D$, on the other hand, does have an incoming edge and, consequently, is not a source vertex.

In step 760 of method 700, it is determined whether there is a unique source vertex resulting from application of steps 710–750 to identify source vertices defined by a join view and its underlying base tables. A source vertex is a unique source vertex if it is the one and only one source vertex identified in step 750. Referring to FIG. 10A, it was determined that SC1 is a source vertex, but SC2 is not. SC1, being the exactly one source vertex identified in step 750, is, therefore, a unique source vertex. In FIG. 10B there is only one source vertex and, by definition, it is a unique source vertex. SC1 of FIGS. 10C and 10D constitute unique source vertices for the same reasons given in reference to FIGS. 10A and 10B, respectively.

Applying step 760 to the source vertices defined by the join view of FIG. 4A and its base tables (FIGS. 2A and 2B, respectively), it is clear that $SC_E$, being the only source vertex identified from the set $\{SC_E, SC_D\}$, is a unique source vertex.

If the result of step 760 is a determination that there is no unique source vertex defined by a join view, none of the tables providing data to the join view are key-preserved tables. Consequently, the method proceeds to block 770 where it is concluded that data may not be modified in the join view without possibility of side-effect. If, on the other hand, it is determined in step 760 that there is a unique source vertex defined by a join view, each of the tables defining the unique source vertex is a key-preserved table and the method proceeds to step 780 where it is concluded that data from those each of the tables defining the unique source vertex may be modified in the join view without side-effect.

In FIGS. 9A and 10A, for example, the table represented by node A in FIG. 9 is a key-preserved table because it defines strong component SC1, source vertex SC1 and ultimately unique source vertex SC1. SC2 does not define a unique source vertex. Therefore, data presented in the join view corresponding to the directed graph of FIG. 9A may be modified without possibility of side-effect only if the modification translates to a modification of data in the table represented by node A. In FIGS. 9B and 10B, the table represented by node A and the table represented by node B are key-preserved tables because they define unique source vertex SC1. Therefore any data presented in the join view corresponding to the directed graph of FIG. 9B may be modified without possibility of side-effect. Like reasoning reveals that the tables represented by nodes A and B, but not C of FIG. 9C are key-preserved tables, and that the tables represented by nodes A, B and C of FIG. 9D are key-preserved tables. Join view data from the table represented by node C of FIG. 9C cannot be modified without possible side-effect, while any data presented in the join view corresponding to the directed graph of FIG. 9D may be modified without possibility of side-effect.

Returning to the join view of FIG. 4A and its underlying base tables, since table Employee defines unique source vertex $SC_E$, data appearing in the join view which is drawn from table Employee may be modified without possibility of side effects. In contrast, data appearing in the view which is drawn from table Department may not be modified without possibility of side-effects. Specifically, a DBMS user may modify data in the EmployeeNo, Name, Salary and DeptNo categories of the join view without side-effects because the data presented in each of these categories is drawn from key-preserved table Employee. Data from the Location and DeptName categories, drawn from non-key-preserved table Department, may not be modified without possible side-effects. This result is consistent with that obtained above when an attempt to modify Joe's salary in EmpView produced no side-effect, but an attempt to modify Joe's location caused Jan's location to be changed as well. Modification of Joe's salary in EmpView translates to modification of key-preserved table, Employee. Modification of Joe's location in EmpView translates to a modification of non-key-preserved table, Department.

It will be appreciated by those skilled in the computer science arts that the method of FIG. 7 may be employed in a number of ways without deviating from the spirit and scope of the present invention. For example, in one embodiment, the method might be performed when a view is initially defined (or presented). If any key-preserved tables are identified, then data may be stored to indicate which tables are key-preserved with respect to the view. This data may then be consulted later to determine whether any particular datum within the view may be modified by a user. In another embodiment, the method could be performed in response to the first attempt to modify data presented in a join view.

Having described a method for practicing the present invention, it bears emphasis that the individual steps therein may be performed by a general purpose processor programmed with instructions that cause the processor to perform the recited steps, specific hardware components that contain hard-wired logic for performing the recited steps, or any combination of programmed general purpose computer components and custom hardware components. Nothing disclosed herein should be construed as limiting the present invention to a single embodiment wherein the recited steps are performed by a specific combination of hardware components.

A method and apparatus for selectively allowing data presented in a join view to be modified is thus described. While the present invention has been described in particular embodiments and through particular examples, the present invention should not be construed as limited by such embodiments and examples, but rather construed according to the following claims.

What is claimed is:

1. A method for selectively allowing data presented in a join view to be modified, the method comprising the computer-implemented steps of:

identifying a plurality of tables that provide data to the join view;

identifying one or more tables of the plurality of tables as key-preserved tables with respect to the join view; and allowing only data provided to the join view by the one or more key-preserved tables to be modified.

2. The method of claim 1 wherein said step of identifying a plurality of tables that provide data to the join view comprises the step of inspecting a definition of the join view.

3. The method of claim 1 wherein said step of identifying one or more tables as key-preserved tables comprises the steps of:

identifying each key of a first table of the plurality of tables; and determining whether each key of the first table is a key of the join view.

4. The method of claim 1 wherein said step of identifying one or more tables as key-preserved tables comprises the step of identifying a unique source vertex defined by one or more tables of the plurality of tables, each of the one or more tables defining the unique source vertex being a key-preserved table.

5. The method of claim 4 wherein said step of identifying a unique source vertex comprises the steps of:

identifying at least one directed edge between the plurality of tables;

identifying at least one strong component based on the at least one directed edge, the at least one strong component being defined by one or more tables of the plurality of tables; and determining the strong component to be the only strong component defined by the plurality of tables which has no incoming directed edge, a unique source vertex being defined by the one or more tables defining the strong component.

6. The method of claim 4 wherein said step of identifying a unique source vertex comprises the steps of:

identifying each directed edge between the plurality of tables;

identifying one or more strong components defined by the plurality of tables based on directed edges between the plurality of tables, each strong component being defined by one or more tables of the plurality of tables;

determining a first strong component of the one or more strong components to be the only strong component which has no incoming directed edge, a unique source vertex being defined by the one or more tables defining the first strong component.

7. The method of claim 6 wherein said step of identifying each directed edge between the plurality of tables comprises the steps of:

identifying an edge between two tables of the plurality of tables; and directing the edge toward a first table of the two tables.

8. The method of claim 7 wherein said step of identifying an edge between two tables comprises the step of inspecting a definition of the join view to identify a join predicate equi-joining the two tables, and wherein said step of directing the edge toward a first table of the two tables comprises the step of determining a key of the first table to be an operand in the join predicate.

9. The method of claim 6 wherein said step of identifying each directed edge between the plurality of tables comprises the steps of:

inspecting a definition of the join view to identify a join predicate defining an edge between two tables of the plurality of tables;

identifying an operand of the join predicate which is a key of a first table of the two tables; and directing the edge toward the first table.

10. The method of claim 6 wherein said step of identifying one or more strong components comprises the step of identifying a set of one or more tables from the plurality of tables, each table in the set being routed to each other table in the set by one or more directed edges.

11. The method of claim 1 wherein said step of identifying one or more tables as key-preserved tables comprises the steps of:

generating a graph that includes a set of nodes and a set of directed edges connecting the nodes, wherein each node corresponds to one of the plurality of tables and each directed edge represents a relationship between two tables of the plurality of tables with respect to the join view; and identifying a unique source vertex in the graph, each of the one or more tables defining the unique source vertex being a key-preserved table.

12. The method of claim 11 wherein said step of identifying a unique source vertex comprises the steps of:

identifying one or more strong components based on the set of nodes and the set of directed edges, each of the one or more strong components comprising one or more nodes of the set of nodes; and determining one strong component of the one or more strong components to be the only strong component which has no incoming directed edge, the one strong component defining a unique source vertex.

13. The method of claim 12 wherein said step of identifying one or more strong components comprises the step of identifying a group of one or more nodes from the set of nodes, each node in the group being routed to each other node in the group by one or more directed edges.

14. The method of claim 11 wherein said step of generating a graph that includes a set of nodes and a set of directed edges connecting the nodes comprises the steps of:

identifying an edge between two nodes of the set of nodes; and directing the edge toward a first node of the two nodes.

15. The method of claim 14 wherein said step of identifying an edge between two nodes comprises the step of inspecting a definition of the join view to identify a join predicate equi-joining two tables corresponding to the two nodes, and wherein said step of directing the edge toward a first node of the two nodes comprises the step of determining a key of a first table of the two tables to be an operand in the join predicate.

16. A method for selectively allowing data presented in a join view to be modified comprising the steps of:

inspecting a definition of the join view to identify tables providing data to the join view;

inspecting the definition of the join view to identify directed edges between two of the tables;

identifying at least one set of tables from the tables, the set of tables comprising at least one table and each table in the set being routed to each other table in the set by the directed edges;

determining that only a first set of tables of the at least one set of tables has no incoming directed edge extending from a table outside the set of tables; and allowing only data provided to the join view by the first set of tables to be modified.

17. A computer system comprising:

a processor;

a memory coupled to said processor; said memory having stored therein tables comprising categories of data, the categories containing data organized in a plurality of records, each record being uniquely identified by a key value;

a join view of data held in the tables;

sequences of instructions which, when executed by said processor, cause said processor to allow data presented in the join view to be modified, the sequence of instructions causing the processor to perform the steps of:

identifying at least one of the tables as a key-preserved table with respect to the join view; and allowing data presented in the join view to be modified if the data is provided to the join view by the key-preserved table.

18. A computer-readable medium having stored thereon a plurality of sequences of instructions, said plurality of sequences of instructions including instructions which, when executed by a processor, cause said processor to perform the steps of:

identifying a plurality of tables that provide data to the join view;

identifying one or more tables of the plurality of tables as key-preserved tables with respect to the join view; and allowing only data provided to the join view by the one or more key-preserved tables to be modified.

19. The computer-readable medium recited in claim 18, wherein the step of identifying a plurality of tables that provide data to the join view further comprises the step of inspecting a definition of the join view.

20. The computer-readable medium of claim 18 wherein the step of identifying one or more tables as key-preserved tables comprises the steps of:

identifying each key of a first table of the plurality of tables; and determining whether each key of the first table is a key of the join view.

21. The computer-readable medium of claim 18 wherein the step of identifying one or more tables as key-preserved tables comprises the step of identifying a unique source vertex defined by one or more tables of the plurality of tables, each of the one or more tables defining the unique source vertex being a key-preserved table.

22. The computer-readable medium of claim 21 wherein the step of identifying a unique source vertex comprises the steps of:

identifying at least one directed edge between the plurality of tables;

identifying at least one strong component based on the at least one directed edge, the at least one strong component being defined by one or more tables of the plurality of tables; and determining the strong component to be the only strong component defined by the plurality of tables which has no incoming directed edge, a unique source vertex being defined by the one or more tables defining the strong component.

23. The computer-readable medium of claim 21 wherein the step of identifying a unique source vertex comprises the steps of:

identifying each directed edge between the plurality of tables;

identifying one or more strong components defined by the plurality of tables based on directed edges between the plurality of tables, each strong component being defined by one or more tables of the plurality of tables;

determining a first strong component of the one or more strong components to be the only strong component which has no incoming directed edge, a unique source vertex being defined by the one or more tables defining the first strong component.

24. The computer-readable medium of claim 23 wherein the step of identifying each directed edge between the plurality of tables comprises the steps of:

identifying an edge between two tables of the plurality of tables; and directing the edge toward a first table of the two tables.

25. The computer-readable medium of claim 24 wherein the step of identifying an edge between two tables comprises the step of inspecting a definition of the join view to identify a join predicate equi-joining the two tables, and wherein the step of directing the edge toward a first table of the two tables comprises the step of determining a key of the first table to be an operand in the join predicate.

26. The computer-readable medium of claim 23 wherein the step of identifying each directed edge between the plurality of tables comprises the steps of:

inspecting a definition of the join view to identify a join predicate defining an edge between two tables of the plurality of tables;

identifying an operand of the join predicate which is a key of a first table of the two tables; and directing the edge toward the first table.

27. The computer-readable medium of claim 23 wherein the step of identifying one or more strong components comprises the step of identifying a set of one or more tables from the plurality of tables, each table in the set being routed to each other table in the set by one or more directed edges.

28. The computer-readable medium of claim 18 wherein the step of identifying one or more tables as key-preserved tables comprises the steps of:

generating a graph that includes a set of nodes and a set of directed edges connecting the nodes, wherein each node corresponds to one of the plurality of tables and each directed edge represents a relationship between two tables of the plurality of tables with respect to the join view; and identifying a unique source vertex in the graph, each of the one or more tables defining the unique source vertex being a key-preserved table.

29. The computer-readable medium of claim 28 wherein the step of identifying a unique source vertex comprises the steps of:

identifying one or more strong components based on the set of nodes and the set of directed edges, each of the one or more strong components comprising one or more nodes of the set of nodes; and determining one strong component of the one or more strong components to be the only strong component which has no incoming directed edge, the one strong component defining a unique source vertex.

30. The computer-readable medium of claim 29 wherein the step of identifying one or more strong components comprises the step of identifying a group of one or more nodes from the set of nodes, each node in the group being routed to each other node in the group by one or more directed edges.

31. The computer-readable medium of claim 28 wherein the step of generating a graph that includes a set of nodes and a set of directed edges connecting the nodes comprises the steps of:

identifying an edge between two nodes of the set of nodes; and directing the edge toward a first node of the two nodes.

32. The computer-readable medium of claim 31 wherein the step of identifying an edge between two nodes comprises the step of inspecting a definition of the join view to identify a join predicate equi-joining two tables corresponding to the two nodes, and wherein the step of directing the edge toward a first node of the two nodes comprises the step of determining a key of a first table of the two tables to be an operand in the join predicate.

33. A computer-readable medium having stored thereon a plurality of sequences of instructions, said plurality of sequences of instructions including sequences of instructions which, when executed by a processor, cause said processor to perform the steps of:

inspecting a definition of a join view to identify tables providing data to the join view;

inspecting the definition of the join view to identify directed edges between two of the tables;

identifying at least one set of tables from the tables, the set of tables comprising at least one table and each table in the set being routed to each other table in the set by the directed edges;

determining that only a first set of tables of the at least one set of tables has no incoming directed edge extending from a table outside the set of tables; and allowing only data provided to the join view by the first set of tables to be modified.

* * * * *